United States Patent [19]
Chalmers et al.

[11] Patent Number: 5,504,809
[45] Date of Patent: Apr. 2, 1996

[54] COMMUNICATION SYSTEM FOR USE IN A MINE

[75] Inventors: Frank Chalmers; Robert Millions, both of South Porcupine, Canada

[73] Assignee: Placer Dome Inc., South Porcupine, Canada

[21] Appl. No.: 115,619

[22] Filed: Sep. 3, 1993

[51] Int. Cl.⁶ .............................. H04M 1/60; H04M 11/00
[52] U.S. Cl. .............................. 379/167; 379/60; 455/33.2
[58] Field of Search .......................... 379/167, 171–173, 379/170, 176, 33, 157, 187, 329, 387, 110, 1, 98, 172, 102, 104, 105, 56.57, 58; 340/989; 455/40.14, 55.1, 33.1, 33.2; 371/60, 61

[56] References Cited

U.S. PATENT DOCUMENTS

| | | | |
|---|---|---|---|
| 4,113,985 | 9/1978 | Day | 379/33 |
| 4,342,021 | 7/1982 | Schaller | 340/989 |
| 4,490,584 | 12/1984 | Lucey | 179/100 |
| 4,495,495 | 1/1985 | Ormanns et al. | 340/825.45 |
| 4,495,496 | 1/1985 | Miller, III | 340/825.54 |
| 4,539,706 | 9/1985 | Mears et al. | 455/11 |
| 4,607,389 | 8/1986 | Halgrimson | 455/11 |
| 4,777,652 | 10/1988 | Stolarczyk | 455/3 |
| 4,803,487 | 2/1989 | Willard et al. | 340/825.44 |
| 4,885,796 | 12/1989 | Loftus | 455/11 |
| 5,070,967 | 12/1991 | Katzy et al. | 187/116 |
| 5,282,239 | 1/1994 | Yokoi et al. | 379/61 |
| 5,329,576 | 7/1994 | Handforth | 379/59 |
| 5,390,339 | 2/1995 | Bruckert et al. | 455/33.2 |

FOREIGN PATENT DOCUMENTS

91/00443  6/1992  WIPO.

*Primary Examiner*—Stephen Chin
*Assistant Examiner*—Kevin Kim
*Attorney, Agent, or Firm*—Ridout & Maybee

[57] ABSTRACT

A communication system for use in a mine to provide two-way communication between a conveyance which moves in a mine and a communication network located in the mine. The system comprising: means for producing a signal indicative of the location of the conveyance in the mine; a plurality of repeaters situated in the mine and being coupled to the communication network; and a controller for controlling the repeaters and the controller being responsive to the signal and having means for activating the repeater which is proximate to the conveyance so that a communication link is provided between the conveyance and the communication network.

7 Claims, 4 Drawing Sheets

COMMUNICATION SYSTEM FOR USE IN A MINE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

FIELD OF THE INVENTION

This invention relates to communication systems. More particularly, it relates to a communication system which is suitable for use in an underground mine.

BACKGROUND OF THE INVENTION

Communication in a mine is vital, not only to ensure the safety of the miners, but also to coordinate the work effort. Because of the nature of an underground mine, there is a need for a reliable and satisfactory communication system. It will be appreciated that the environment of an underground mine system places considerable demands on a communication system.

In the prior art, there are known mine communication systems which are based on radio transmission. While it is possible to provide a working communication system, a radio-based system has its limitations. Firstly, a radio system is one-way, and therefore, communication between a miner and the surface is limited and can be broken. In addition, the characteristics of a mine, e.g. type of ore body and tunnelling, can affect the propagation of radio frequencies, thereby limiting the number of available channels for communication and accessibility of the communication system to the miners.

Furthermore, the communication system at the surface of a mine typically comprises a telephone system. A telephone system provides two-way communication and also provides a gateway to any number of emergency/rescue agencies. In practical terms this means that there are two communication systems operating on a mine site and while integrating the two systems is desirable, it can be expensive.

Another consideration for a communication system for use in an underground mine is the potential effect of electromagnetic radio waves propagating through the shafts. Since blasting caps can be ignited by radio signals having certain frequencies and/or power levels, the power level and frequency of signals utilized in a mine communication system must be a consideration.

Therefore, it is desirable to provide a communication system for use in a mine which can be integrated with the existing telephone system of the mine. It also desirable to provide the communication system with a two-way communication capability for full telephone service. Lastly, the transmission characteristics, e.g. power level and frequency range, of the system should provide optimum performance without any dangerous consequences in the mining environment.

BRIEF SUMMARY OF THE INVENTION

In a first aspect the present provides a communication system for use in a mine to provide two-way communication between a conveyance which moves in a mine and a communication network located in the mine, the system comprising: (a) means for producing a signal indicative of the position of the conveyance in the mine; (b) a plurality of repeater means situated in the mine and being coupled to said communication network; (c) controller means for controlling said repeater means and said controller means being responsive to said signal and having means for activating said repeater means which is proximate to the conveyance so that a two-way communication link is provided between the conveyance and the communication network.

In a second aspect, the present invention provides a method for controlling the operation of a communication system for use in a mine having a telephone set located in a conveyance which moves in a mine shaft, and a plurality of repeater stations located adjacent the mine shaft and coupled to the communication system, said method including the steps of: (a) determining the position of the conveyance in the mine shaft; (b) determining the repeater station which is proximate to the conveyance and activating said proximate repeater station so that a communication link is provided between the telephone set in the conveyance and the communication network; and (c) deactivating said other repeater stations.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE PREFERRED EMBODIMENTS

Figure 1:
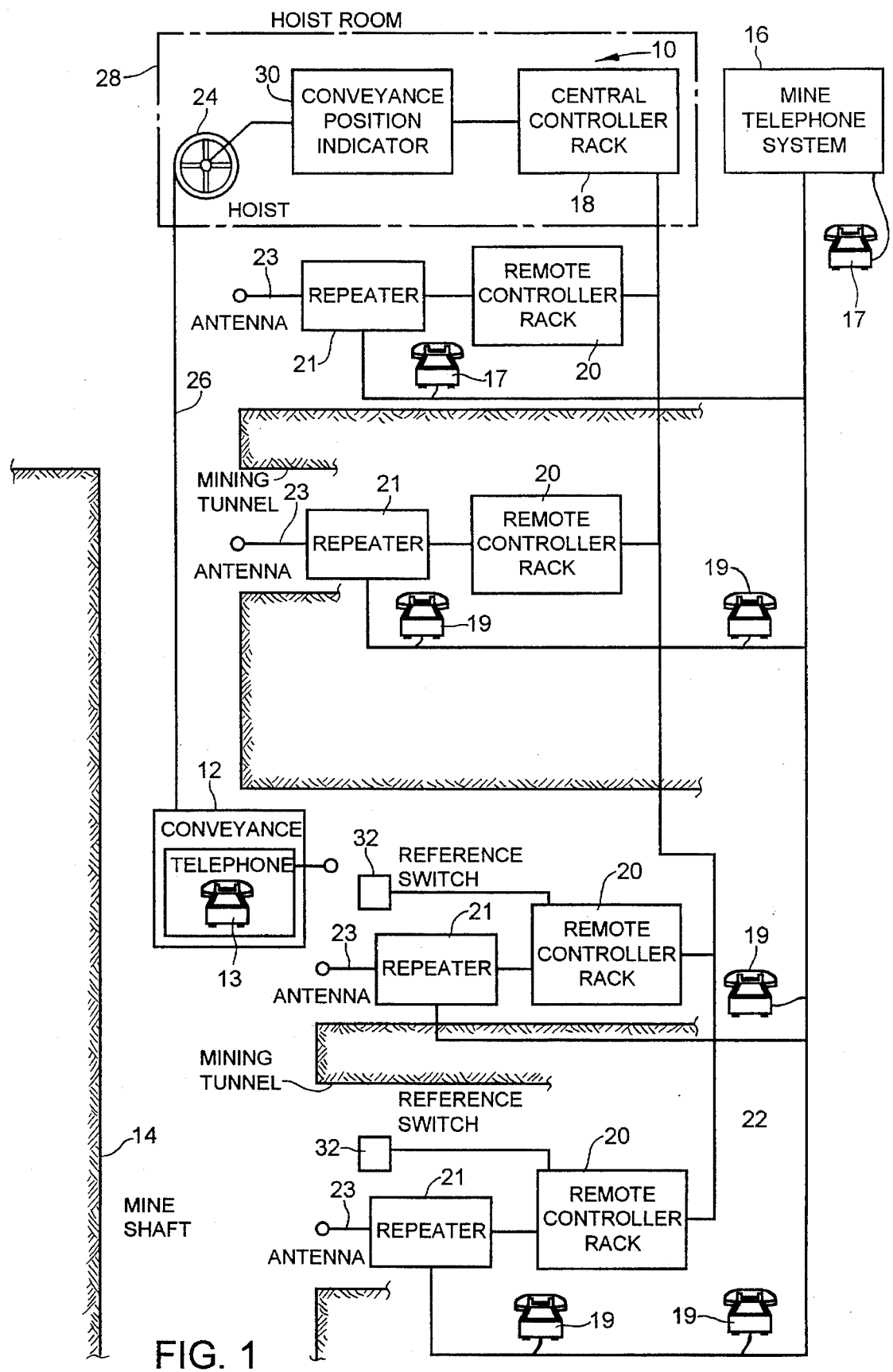
FIG. 1 shows in block diagram form a communication system for use in a mine according to the present invention.

Reference is first made to FIG. 1 which shows in block diagram a communication system 10 according to the present invention. The communication system 10 is suitable for use in an underground mine and provides a two-way communication link between a conveyance 12 which moves in a mine shaft 14 and a mine telephone system 16. The conveyance 12 has a telephone 13 and as will be explained below, the communication system 10 according to the present invention couples the telephone 13 into the mine telephone system 16. Thus, the miners travelling in the conveyance 12 can stay in full contact with the rest of mine. In addition, the system 10 provides an extra level of safety for inspection of the mine shaft 14 and "in-shaft" maintenance.

As shown in FIG. 1, the communication system 10 comprises a central controller rack 18 and a number of remote controller racks 20. The remote controller racks 20 are located at various levels through mine. Each of the remote controllers 20 is connected to a repeater 21. Each repeater 21 includes an antenna 23 and can comprise a known cordless phone station which has been industrially hardened to withstand the harsh environment of a mine. As will be explained below, the repeater 21 is used to couple the conveyance telephone 13 into the mine telephone system 16.

The mine telephone system 16 includes surface telephones 17 and field telephones 19. The telephones 17,19 can be wired into the system 16 or can comprise conventional portable or cordless telephone sets. The conveyance telephone 13 can also comprise a cordless or portable telephone unit which preferably has been industrially hardened for use in a mining environment. A portable set 13 in the conveyance provides a miner with mobility to do shaft inspections, for example. As shown in FIG. 1, the first remote controller 20 and repeater 21 are located at the top of the mine shaft 14.

The remote controller racks 20 are coupled to the central controller rack 18 through a bus 22. The bus 22 allows the central controller 18 to send commands and status requests to any one or all of the remote controllers 20. The central controller 18 uses the bus 22 to control the remote controllers 20.

In known manner, the conveyance 12 is raised and lowered in the mine shaft 14 by a hoist 24. The hoist 24 typically comprises a drum and cable 26, which are located in a hoist room, indicated generally by reference 28. The central controller rack 18 is typically located in the "hoist" room 28 for convenience. The central controller 18 is coupled to the hoist 24 through a conveyance position indicator 30. The conveyance position indicator 30 provides the central controller 18 with a signal that is indicative of the position of the conveyance 12 in the mine shaft 14. The central controller 18 uses the position of the conveyance 12 to determine which repeater 21 to turn on. This ensures that there is a strong signal between the conveyance telephone 13 and the mine telephone system 16 with minimum interference from the other repeaters.

To verify the position of the conveyance 12 (and ensure the integrity of the system 10), position reference switches 32 are located at known positions in the mine shaft 14. These reference switches 32 are coupled to a respective remote controller 20. As will be explained in detail below, when the conveyance 12 passes a reference switch 32 a signal is produced which is read by the remote controller 20 and sent to the central controller 18. The central controller 18 uses this signal to verify the position of the conveyance 12 as determined from the conveyance position indicator 30.

Figure 2:
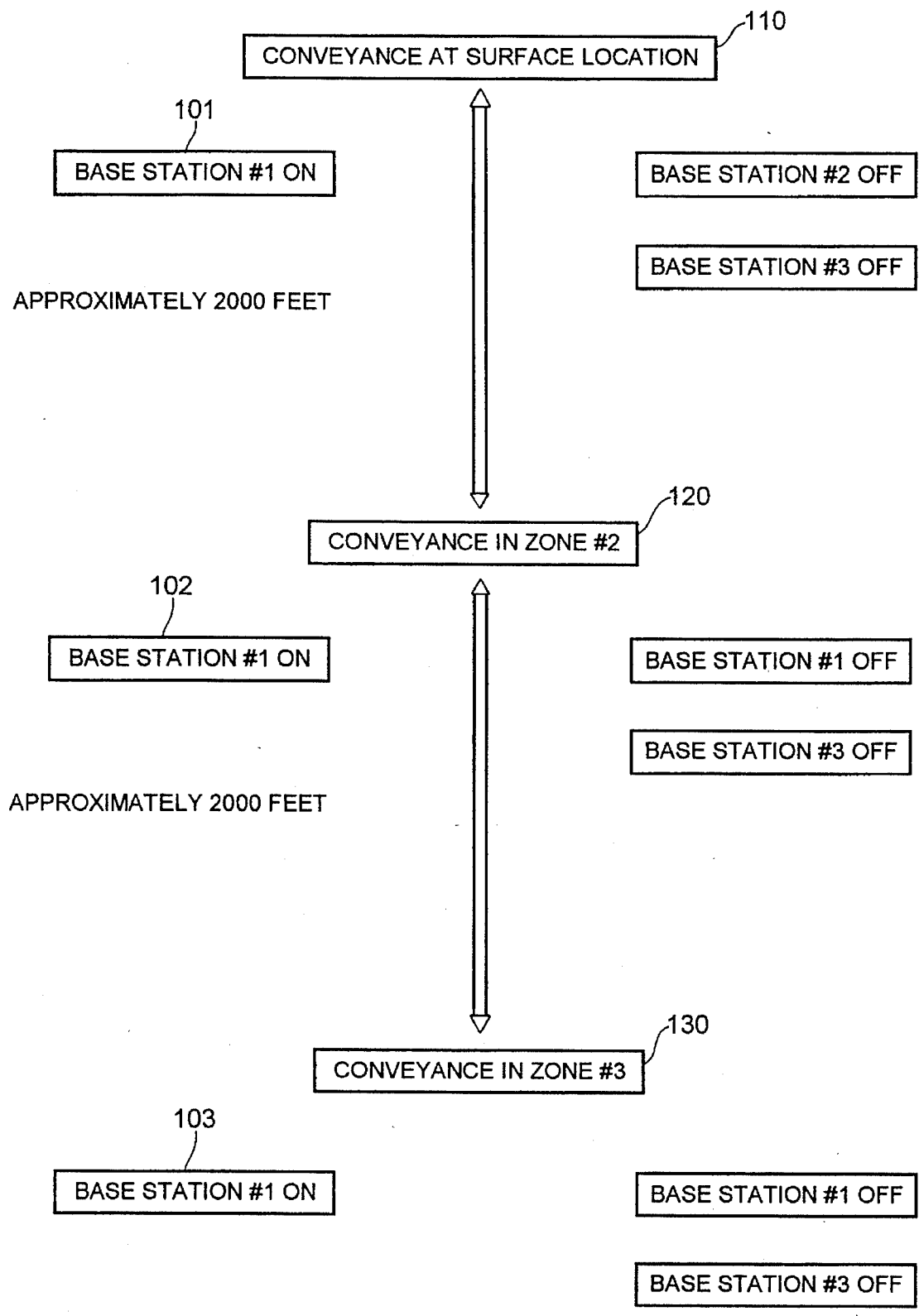
FIG. 2 shows in diagrammatic form the operation of the communication system of FIG. 1 as a conveyance moves through the mine.

Reference is next made to FIG. 2 which provides an overview of the operation of the communication system 10 according to the present invention. For this example, there are three base stations or levels along the mine shaft 14, each comprising a repeater 21 and remote controller rack 20. Base station #1 (reference 101) is located at the surface level of the mine shaft 14 as indicated by reference 110. Base station #2 is located at a first level which in this example is 2000 feet below the surface, as indicated by reference 120. Base station #3 is located at the second level below the surface, e.g. 4000 feet, as indicated by reference 130. When the conveyance 12 is at the surface 110, the central controller rack 20 activates the repeater 21 which is closest, in this case, base station #1 (101). The other repeaters 21 (i.e. Base Stations #2 and #3) are deactivated to ensure a strong signal between the conveyance telephone 13 and the mine telephone system 16 and also to minimize the interference from the other repeaters (i.e. Base Stations #2 and #3).

Referring still to FIG. 2, as the conveyance 12 moves down the mine shaft 14, the central controller 18 uses the position indicator 30 to determine the position of the conveyance 12. For example, when the conveyance 12 moves within the range of the repeater 21 located at the first level below the surface 120, the central controller 18 activates the repeater 21 at Base Station #2 and deactivates the repeaters 21 at Base Stations #1 and #3. Similarly, when the conveyance 12 moves further down the mine shaft 14 to the second level 130 (e.g. 4000 feet), the central controller 18 activates the repeater 21 at Base Station #3 and deactivates the repeaters 21 at Base Stations #2 and #3. The same procedure, except in reverse, is followed as the conveyance 12 returns to the surface level 110.

Figure 3:
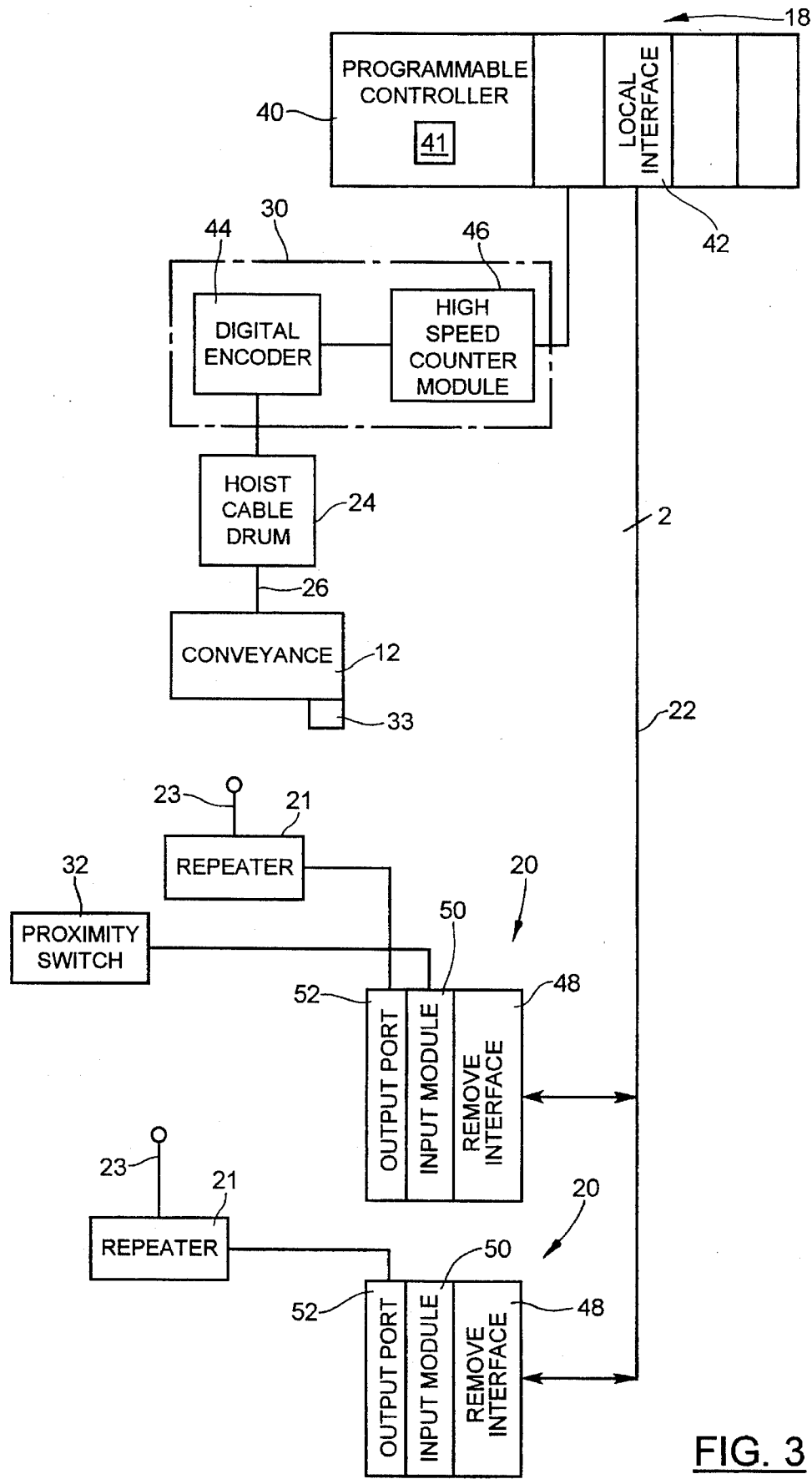
FIG. 3 shows in block diagram form the central and remote controllers for the system of FIG. 1.

Reference is next made to FIG. 3 which shows in more detail the elements of the communication system 10 of FIG. 1. The central controller rack 20 comprises a programmable controller 40 and a local interface module 42.

The programmable controller 40 is used to run a computer program 41 which is used to control the system 10 as will be explained with reference to FIG. 4. A suitable device for the programmable controller 40 is the SY/MAX* Model 400 processor which is available from the Square D Company in the United States. (The Specification Sheets for the Model 400 Processor and other SY/MAX* devices referred to are incorporated herein by reference.) The Model 400 Processor includes an instruction set which is suited for control applications and can be readily programmed by one skilled in the art. The Model 400 processor is a module which can be plugged into the SY/MAX* Class 8030 Type HRK-150 Register/Digital Rack Assembly which is also available from the Square D Company. The Rack Assembly includes a number of slots which accept modules (e.g. controller, input, output or interface modules). The Rack Assembly provides power and a backplane (or bus) for the plugged-in modules.

*Trademark

As shown in FIG. 3, the conveyance position indicator 30 comprises a digital encoder 44 and a high speed counter module 46. In known manner, the digital encoder 44 is mechanically attached to a drive shaft (not shown) off the hoist drum 24 (FIG. 1). The digital encoder 44 is coupled to the high speed counter module 46 and produces a number value in the form of digital pulses for every increment (e.g foot) that the conveyance 12 actually moves up or down the mine shaft 14.

The high speed counter module 46 accepts the pulses from the digital encoder 44 and "counts" the number of pulses. It will be appreciated that the number of pulses corresponds to the position of the conveyance 12 in the shaft 14. The high speed counter module 46 is coupled to the programmable controller 40 and the programmable controller 40 uses the pulse count to determine the position of the conveyance 12. A suitable commercially available device for the counter module 46 is the SY/MAX* Class 8030 Type RIM-131 High Speed Counter Module which is also available from the Square D Company in the United States. The Type RIM-131 Counter Module is compatible with the Class 8020 Processor and can be plugged in the Rack Assembly (see above). The RIM-131 Counter Module is configured to run in single count pulse train with direction signal mode as will be understood by one skilled in the art.

Referring still to FIG. 3, the local interface module 42 provides the interface between the programmable controller 40 and the remote controller racks 20. A suitable commercially available device for the local interface module 42 is the SY/MAX* Class 8030 Local Interface which is available from the Square D Company. The local interface module 42 allows the programmable controller 40 to communicate with the remote controller racks 20 over a two-pair twisted shielded cable (i.e. bus 22 in FIG. 1). The local interface module 42 is mounted in the Rack Assembly and coupled to the programmable controller 40 through the backplane bus (not shown).

The remote controller rack 20 includes a remote interface module 48, an input module 50 and an output module 52. The remote interface module 48 is coupled to the programmable controller 40 through the bus 22 and local interface module 42 to provide the link between the central controller rack 18 and the remote controller racks 20. A suitable assembly for the remote controller rack 20 is the SY/MAX* Class 8030 Type HRK-100 I/O Rack Assembly which is also available from the Square D Company. Similar to the central controller rack (see above), the Type HRK-100 Rack provides a rugged assembly into which the interface module 48, input module 50 and output module 52 can be plugged.

A suitable commercially available unit for the remote interface module 48 is the SY/MAX* Class 8030 Remote Interface which is also available from the Square D Company. The Class 8030 Remote Interface provides the communication interface between the programmable processor 40 and the input and output modules 50,52 in the remote controller racks 20.

As shown in FIG. 3, the output module 52 is coupled to the repeater 21. Under the control of the programmable controller 40, the output module 52 is used to activate/deactivate the repeater 21 (as determined by the position of the conveyance 12 in the mine shaft 14). A suitable commercially available device for the output module is the SY/MAX* Class 8030 Type HOM-251 Output Module which is also available from the Square D Company. The HOM-251 Output Module contains eight optically isolated outputs, each of which is capable of driving a load. In the system 10, the programmable controller 40 uses one of these optically isolated outputs to drive the power feed line for the associated repeater 21, which allows the repeater 21 to be turned on and off by the programmable controller 40.

Lastly in reference to FIG. 3, the input module 50 couples the position reference switch 32 to the remote interface 48 (and the central controller rack 18). The position reference switch 32 is used to verify the position of the conveyance 12 in the mine shaft 14. In the preferred embodiment of the present invention, the reference switch 32 comprises a Triac Magnetic Proximity Switch such as the CR 9440-QST2 which is manufactured by Canadian General Electric. The CR 9440-QST2 is contact-making device with one normally open Triac circuit which is arranged to become conductive when the device is placed in a magnetic field. When the magnetic field is removed (or reduced sufficiently), the Triac circuit reverts to the non-conducting state. The Triac circuit (in the proximity switch 32) is connected to an input on the input module 50 which is used by the programmable controller 40 to read the state of the proximity switch, i.e. open or closed.

A suitable device for the input module 42 is the SY/MAX* Class 8030 Type HIM-101 Input Module which is also available from the Square D Company. The HIM-101 Input Module is compatible with the HRK-150 Register/Digital Rack Assembly and the other SY/MAX* family modules.

As shown in FIG. 3, the conveyance 12 includes a magnet 33 of suitable field strength to trip the proximity switch 32 when the conveyance 12 passes by the switch 32. When the proximity switch 32 is tripped or closed this will generate a signal for the programmable controller 40. Since the proximity switch 32 is located at a fixed location in the mine shaft 14, the signal which is generated by the switch provides a reference that the programmable controller 40 uses to check the position of conveyance as determined by the counter module 46.

Figure 4:
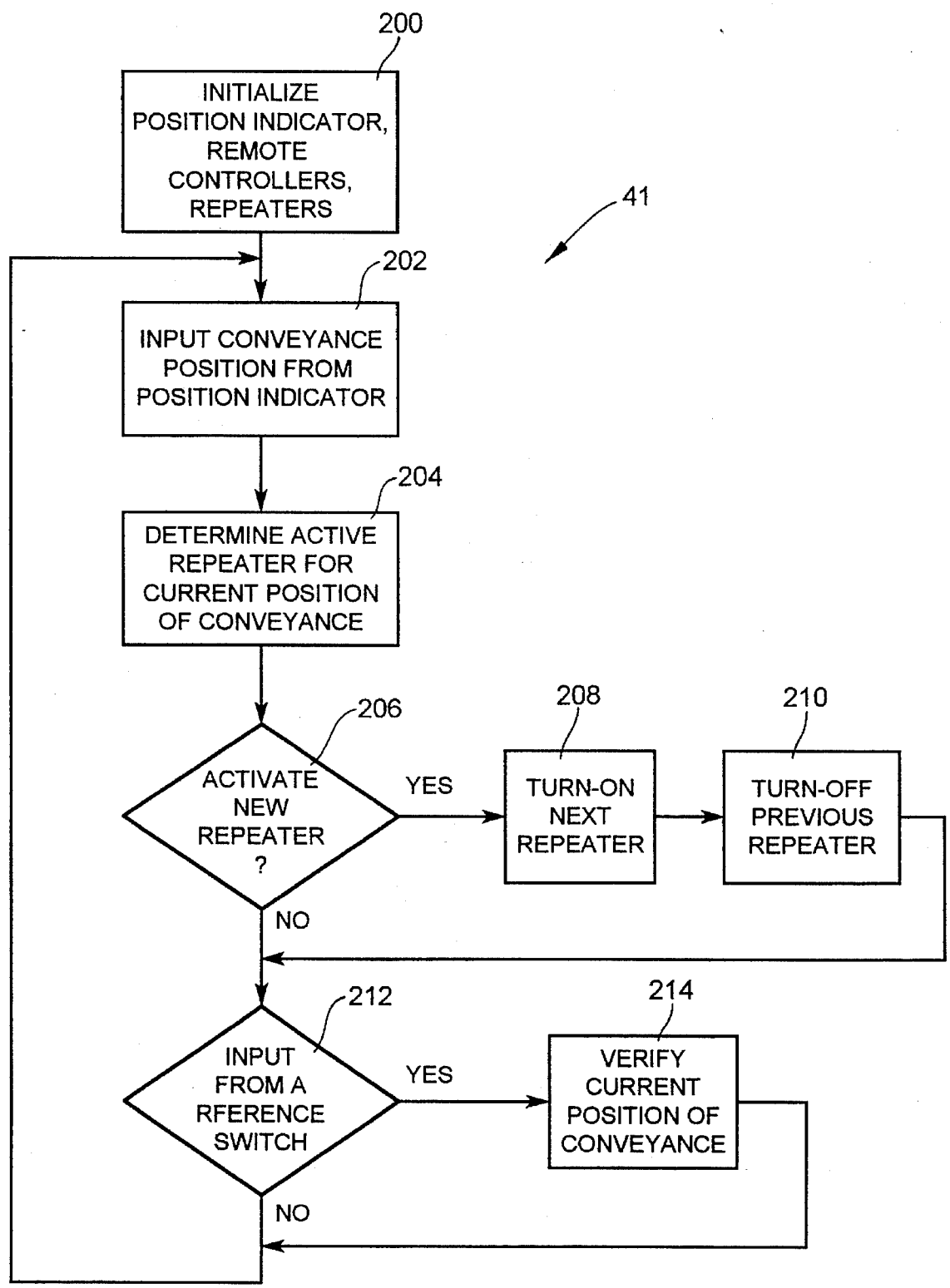
FIG. 4 shows in flow chart the decision steps embodied in the control of the communication system of FIG. 1.

Reference is next made to FIG. 4 which shows in flow chart the method steps embodied in the computer program 41 which is run by the programmable controller 40 for controlling the activation/deactivation of the repeaters 21. The program 41 is implemented in a "Programmable Logic Controller" format using the instruction set of the SY/MAX* Model 400 Processor. A code listing for the computer program 41 is included as an Appendix to this document.

The first logic step involves initializing the communication system 10 when power is first turned (as indicated by block 200). The initialization 200 can involve a number of operations such as performing a memory check for the programmable controller 40 (FIG. 2) and turning all the repeaters 21 off, for example.

Once the communication system 10 has been initialized, the central controller 18 is ready to receive inputs from the conveyance position indicator 30 (i.e. high speed counter module 46). As explained above, the "count" from the counter module 46 is responsive to the movement of the conveyance 12 and indicative of the position of the conveyance 12 (block 202). (The programmable controller 40 can read the count from the counter module 46 using an appropriate ladder diagram program as will be within the understanding of one skilled in art and the reader is referred to the Appendix.) If the conveyance 12 has moved into another "repeater zone", then the repeater 21 must be turned on (block 204). If a repeater 21 is to be turned on (206), then the central controller 18 sends an appropriate command to the respective remote controller 20 instructing it to turn on the repeater 21 (block 208). Similarly, the central controller 18 sends another command to the remote controller 20 for the repeater 21 which was on telling it to turn off the previously active repeater 21 (block 210).

Referring still to FIG. 4, if the conveyance 12 passes a proximity switch 32, then a signal is generated which is received by the central controller 18 (via the remote interface 48 and the input module 50) as indicated by block 212. When this signal is received, the program 41 can verify the position of the conveyance 12 in block 214. The location (i.e. fixed position) of the proximity switch 32 in the mine shaft 14 can be compared to the position of the conveyance 12 as calculated from the "count" received from the counter module 46. For example, the depth or location corresponding to each physical proximity switch 32 can be stored as a "look-up table" in memory.

Although various preferred embodiments of the present invention have been described in detail, it will be appreciated by those skilled in the art, that variations may be made without departing from the spirit of the invention or the scope of the appended claims. * Trademark

APPENDIX

```
RUNG 0227

!I0489                                                            *------------------*
+--] [--+-------+-------+-------+-------+-------+-------+-------+ LET  S0801 - S200+
!  -01       !                                                    *------------------*
!*-----------*!
+ IF  S0059 - 0S1S++    +       +       +       +       +       +
!*-------------------*
```

CROSS REFERENCE

S0801

| 0212LET | 0213LET | 0214LET | 0215LET | 0216LET |
| 0217LET | 0218LET | 0219LET | 0220LET | 0221LET |
| 0222LET | 0223LET | 0224LET | 0225LET | 0226LET |
| 0227LET | 0228LET | 0229LET | 0230LET | 0231LET |
| 0232LET | 0233LET | 0234LET | 0235LET | 0236LET |
| 0237LET | 0238LET |         |         |         |

```
RUNG 0228

!I0489                                                            *------------------*
+--] [--+-------+-------+-------+-------+-------+-------+-------+ LET  S0801 - S300+
!  -02                                                            *------------------*
```

CROSS REFERENCE

S0801

| 0212LET | 0213LET | 0214LET | 0215LET | 0216LET |
| 0217LET | 0218LET | 0219LET | 0220LET | 0221LET |
| 0222LET | 0223LET | 0224LET | 0225LET | 0226LET |
| 0227LET | 0228LET | 0229LET | 0230LET | 0231LET |
| 0232LET | 0233LET | 0234LET | 0235LET | 0236LET |
| 0237LET | 0238LET |         |         |         |

© 1992 Frank Chalmers and Robert Millions

```
RUNG 0229

! I0489                                                            *--------------------*
+---] [-+-------+-------+-------+-------+-------+-------+-------+ LET  S0801 - S400+
!  -03                                                             *--------------------*

CROSS REFERENCE

S0801
0212LET          0213LET          0214LET          0215LET          0216LET

0217LET          0218LET          0219LET          0220LET          0221LET

0222LET          0223LET          0224LET          0225LET          0226LET

0227LET          0228LET          0229LET          0230LET          0231LET

0232LET          0233LET          0234LET          0235LET          0236LET

0237LET          0238LET

RUNG 0230

!                                                                  *--------------------*
+-------+-------+-------+-------+-------+-------+-------+-------+ LET  S0495 -S0801+
!                                                                  *--------------------*

CROSS REFERENCE

S0495
0230LET
```

```
RUNG 0231

!I0461                                                                    *-------------------*
+--] [-+-------+-------+-------+-------+-------+-------+-------+ LET   S0601 - 0001+
!  -03                                                                    *-------------------*

CROSS REFERENCE

S0601
  0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET

RUNG 0232

!I0497                                                                    *-------------------*
+--] [-+-------+-------+-------+-------+-------+-------+-------+ LET   S0601 - 3500+
!  -01                                                                    *-------------------*

CROSS REFERENCE

S0601
  0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET
```

```
RUNG 0233

!I0497                                                              *------------------*
+--] [-+--------+--------+--------+--------+--------+--------+ LET  S0801 - 3600+
!  -02                                                              *------------------*

CROSS REFERENCE

S0801
0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET

RUNG 0234

!I0497                                                              *------------------*
+--] [-+--------+--------+--------+--------+--------+--------+ LET  S0801 - 3700+
!  -03       !                                                      *------------------*
!*-----------*!
+ IF   S0039 - 0367++    +       +       +       +       +       +
!*------------------*!

CROSS REFERENCE

S0801
0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET
```

```
RUNG 0235

! I0461                                                        *------------------*
+--] [-+-------+-------+-------+-------+-------+-------+------→ LET  S0601 - 0002+
!  -04                                                         *------------------*

CROSS REFERENCE

S0601
0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET
```

```
RUNG 0236

! I0461                                                        *------------------*
+--] [-+-------+-------+-------+-------+-------+-------+------→ LET  S0601 - 0003+
!  -07                                                         *------------------*

CROSS REFERENCE

S0601
0212LET        0213LET        0214LET        0215LET        0216LET

0217LET        0218LET        0219LET        0220LET        0221LET

0222LET        0223LET        0224LET        0225LET        0226LET

0227LET        0228LET        0229LET        0230LET        0231LET

0232LET        0233LET        0234LET        0235LET        0236LET

0237LET        0238LET
```

```
RUNG 0237

!I0465                                                       *------------------*
+--] [-+-------+-------+-------+-------+-------+-------+ LET S0801 - 0500+
!  -01                                                       *------------------*

CROSS REFERENCE

S0801
0212LET      0213LET      0214LET      0215LET      0216LET

0217LET      0218LET      0219LET      0220LET      0221LET

0222LET      0223LET      0224LET      0225LET      0226LET

0227LET      0228LET      0229LET      0230LET      0231LET

0232LET      0233LET      0234LET      0235LET      0236LET

0237LET      0238LET

RUNG 0238

!I0465                                                       *------------------*
+--] [-+-------+-------+-------+-------+-------+-------+ LET S0801 - 0800+
!  -02                                                       *------------------*

CROSS REFERENCE

S0801
0212LET      0213LET      0214LET      0215LET      0216LET

0217LET      0218LET      0219LET      0220LET      0221LET

0222LET      0223LET      0224LET      0225LET      0226LET

0227LET      0228LET      0229LET      0230LET      0231LET

0232LET      0233LET      0234LET      0235LET      0236LET

0237LET      0238LET
```

```
RUNG 0239

|                                                         #----------------------#
 +----+-----+-----+-----+-----+-----+-----+-----+ LET   S0494 =S0039 x 0014+
 |                                                         #----------------------#

CROSS REFERENCE

S0494
0072-( )-      0073-( )-      0074-( )-      0155-( )-      0156-( )-

0157-( )-      0188-( )-      0189-( )-      0190-( )-      0239LET

RUNG 0240

!I0461                                                      #----------------#
+--] [--+-----+-----+-----+-----+-----+-----+-----+ LET   S0039 - 0004+
!  -03                                                      #----------------#

CROSS REFERENCE

S0039
0205IF         0208IF         0210CTR        0211IF         0212IF(02)

0213IF(02)     0214IF(02)     0215IF(02)     0216IF(02)     0217IF

0218IF         0219IF         0220IF         0221IF         0222IF

0223IF         0224IF         0225IF         0227IF         0234IF

0239LET        0240LET        0241LET        0242LET        0243LET

0244LET        0245LET        0246LET        0247LET        0248LET

0249LET        0250LET        0251LET        0252LET        0253LET

0254LET        0255LET        0256LET        0257LET        0258LET

0259LET        0260LET        0261LET        0262LET        0263IF

0264IF         0265IF         0266IF         0267IF         0268IF

0269IF         0270IF         0271IF         0273IF
```

RUNG 0241

```
!I0465                                                    +------------------+
+--] [-+-------+-------+-------+-------+-------+-------+---+ LET  S0039 - 0039+
!  -02                                                    +------------------+
```

CROSS REFERENCE

S0039
| 0203IF | 0208IF | 0210CTR | 0211IF | 0212IF(02) |
|--------|--------|---------|--------|------------|
| 0213IF(02) | 0214IF(02) | 0215IF(02) | 0216IF(02) | 0217IF |
| 0218IF | 0219IF | 0220IF | 0221IF | 0222IF |
| 0223IF | 0224IF | 0225IF | 0227IF | 0234IF |
| 0239LET | 0240LET | 0241LET | 0242LET | 0243LET |
| 0244LET | 0245LET | 0246LET | 0247LET | 0248LET |
| 0249LET | 0250LET | 0251LET | 0252LET | 0253LET |
| 0254LET | 0255LET | 0256LET | 0257LET | 0258LET |
| 0259LET | 0260LET | 0261LET | 0262LET | 0263IF |
| 0264IF | 0265IF | 0266IF | 0267IF | 0268IF |
| 0269IF | 0270IF | 0271IF | 0273IF | |

RUNG 0242

```
!I0469                                                    +------------------+
+--] [-+-------+-------+-------+-------+-------+-------+---+ LET  S0039 - 0143+
!  -01                                                    +------------------+
```

CROSS REFERENCE

S0039
| 0203IF | 0208IF | 0210CTR | 0211IF | 0212IF(02) |
|--------|--------|---------|--------|------------|
| 0213IF(02) | 0214IF(02) | 0215IF(02) | 0216IF(02) | 0217IF |
| 0218IF | 0219IF | 0220IF | 0221IF | 0222IF |
| 0223IF | 0224IF | 0225IF | 0227IF | 0234IF |
| 0239LET | 0240LET | 0241LET | 0242LET | 0243LET |
| 0244LET | 0245LET | 0246LET | 0247LET | 0248LET |
| 0249LET | 0250LET | 0251LET | 0252LET | 0253LET |
| 0254LET | 0255LET | 0256LET | 0257LET | 0258LET |
| 0259LET | 0260LET | 0261LET | 0262LET | 0263IF |
| 0264IF | 0265IF | 0266IF | 0267IF | 0268IF |
| 0269IF | 0270IF | 0271IF | 0273IF | |

```
RUNG 0243

!I0469                                                            *--------------------*
+--] [-+--------+--------+--------+--------+--------+--------+ LET  S0059 - 0153+
!  -02                                                            *--------------------*

CROSS REFERENCE

S0059
0205IF         0208IF         0210CTR        0211IF         0212IF(02)

0213IF(02)     0214IF(02)     0215IF(02)     0216IF(02)     0217IF

0218IF         0219IF         0220IF         0221IF         0222IF

0223IF         0224IF         0225IF         0227IF         0234IF

0239LET        0240LET        0241LET        0242LET        0243LET

0244LET        0245LET        0246LET        0247LET        0248LET

0249LET        0250LET        0251LET        0252LET        0253LET

0254LET        0255LET        0256LET        0257LET        0258LET

0259LET        0260LET        0261LET        0262LET        0263IF

0264IF         0265IF         0266IF         0267IF         0268IF

0269IF         0270IF         0271IF         0273IF
```

```
RUNG 0244

! IO469                                                              *-------------------*
+--] [-+-------+-------+-------+-------+-------+-------+-------+ LET  S0039 - 0165+
!  -03                                                               *-------------------*

CROSS REFERENCE

S0039
  0205IF        0208IF        0210CTR       0211IF        0212IF(02)

0213IF(02)    0214IF(02)    0215IF(02)    0216IF(02)    0217IF

0218IF        0219IF        0220IF        0221IF        0222IF

0223IF        0224IF        0225IF        0227IF        0234IF

0239LET       0240LET       0241LET       0242LET       0243LET

0244LET       0245LET       0246LET       0247LET       0248LET

0249LET       0250LET       0251LET       0252LET       0253LET

0254LET       0255LET       0256LET       0257LET       0258LET

0259LET       0260LET       0261LET       0262LET       0263IF

0264IF        0265IF        0266IF        0267IF        0268IF

0269IF        0270IF        0271IF        0273IF

RUNG 0245

! IO473                                                              *-------------------*
+--] [-+-------+-------+-------+-------+-------+-------+-------+ LET  S0039 - 0175+
!  -01                                                               *-------------------*

CROSS REFERENCE

S0039
  0205IF        0208IF        0210CTR       0211IF        0212IF(02)

0213IF(02)    0214IF(02)    0215IF(02)    0216IF(02)    0217IF

0218IF        0219IF        0220IF        0221IF        0222IF

0223IF        0224IF        0225IF        0227IF        0234IF

0239LET       0240LET       0241LET       0242LET       0243LET

0244LET       0245LET       0246LET       0247LET       0248LET

0249LET       0250LET       0251LET       0252LET       0253LET

0254LET       0255LET       0256LET       0257LET       0258LET

0259LET       0260LET       0261LET       0262LET       0263IF

0264IF        0265IF        0266IF        0267IF        0268IF

0269IF        0270IF        0271IF        0273IF
```

```
RUNG 0246

!I047S                                                          *-------------------*
+--] [-+--------+--------+--------+--------+--------+--------+ LET   S0059 - 0186+
!  -02                                                          *-------------------*

CROSS REFERENCE

S0059
0203IF        0208IF        0210CTR       0211IF        0212IF(02)
0213IF(02)    0214IF(02)    0215IF(02)    0216IF(02)    0217IF
0218IF        0219IF        0220IF        0221IF        0222IF
0223IF        0224IF        0225IF        0227IF        0234IF
0239LET       0240LET       0241LET       0242LET       0243LET
0244LET       0245LET       0246LET       0247LET       0248LET
0249LET       0250LET       0251LET       0252LET       0253LET
0254LET       0255LET       0256LET       0257LET       0258LET
0259LET       0260LET       0261LET       0262LET       0263IF
0264IF        0265IF        0266IF        0267IF        0268IF
0269IF        0270IF        0271IF        0273IF

RUNG 0247

!I047S                                                          *-------------------*
+--] [-+--------+--------+--------+--------+--------+--------+ LET   S0059 - 0197+
!  -03                                                          *-------------------*

CROSS REFERENCE

S0059
0203IF        0208IF        0210CTR       0211IF        0212IF(02)
0213IF(02)    0214IF(02)    0215IF(02)    0216IF(02)    0217IF
0218IF        0219IF        0220IF        0221IF        0222IF
0223IF        0224IF        0225IF        0227IF        0234IF

0239LET       0240LET       0241LET       0242LET       0243LET
0244LET       0245LET       0246LET       0247LET       0248LET
0249LET       0250LET       0251LET       0252LET       0253LET
0254LET       0255LET       0256LET       0257LET       0258LET
0259LET       0260LET       0261LET       0262LET       0263IF
0264IF        0265IF        0266IF        0267IF        0268IF
0269IF        0270IF        0271IF        0273IF
```

```
RUNG 0248

!I0477                                                        *-------------------*
+--] [-+-------+-------+-------+-------+-------+-------+------+ LET  S0059 - 0208+
!  -01                                                        *-------------------*

CROSS REFERENCE

S0059
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF

RUNG 0249

!I0477                                                        *-------------------*
+--] [-+-------+-------+-------+-------+-------+-------+------+ LET  S0059 - 0219+
!  -02                                                        *-------------------*

CROSS REFERENCE

S0059
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF
```

```
RUNG 0250

!I0477                                                              *--------------------*
+--] [--+--------+--------+--------+--------+--------+--------+ LET  S0059 - 0228+
!  -03                                                              *--------------------*

CROSS REFERENCE

S0059
0205IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0275IF

RUNG 0251

!I0481                                                              *--------------------*
+--] [--+--------+--------+--------+--------+--------+--------+ LET  S0059 - 0239+
!  -01                                                              *--------------------*

CROSS REFERENCE

S0059
0205IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0275IF
```

```
RUNG 0252

!I0481                                                              *-------------------*
+--] [--+--------+--------+--------+--------+--------+--------+ LET  S0059 - 0250+
!  -02                                                              *-------------------*

CROSS REFERENCE

S0059
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF

RUNG 0253

!I0481                                                              *-------------------*
+--] [--+--------+--------+--------+--------+--------+--------+ LET  S0059 - 0261+
!  -03                                                              *-------------------*

CROSS REFERENCE

S0059
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF
```

```
RUNG 0254

!I0485                                                        *------------------*
+--] [-+------+------+------+------+------+------+------+ LET  S0059 - 0279+
:  -01                                                        *------------------*

CROSS REFERENCE

S0059
0205IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF

RUNG 0255

!I0485                                                        *------------------*
+--] [-+------+------+------+------+------+------+------+ LET  S0059 - 0290+
:  -02                                                        *------------------*

CROSS REFERENCE

S0059
0205IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF
```

```
RUNG 0256

!I0485                                                          *-------------------*
+--] [-+-------+-------+-------+-------+-------+-------+-------+ LET   S0039 - 0301+
!  -03                                                          *-------------------*

CROSS REFERENCE

S0039
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF

RUNG 0257

!I0489                                                          *-------------------*
+--] [-+-------+-------+-------+-------+-------+-------+-------+ LET   S0039 - 0313+
!  -01                                                          *-------------------*

CROSS REFERENCE

S0039
0203IF          0208IF          0210CTR         0211IF          0212IF(02)

0213IF(02)      0214IF(02)      0215IF(02)      0216IF(02)      0217IF

0218IF          0219IF          0220IF          0221IF          0222IF

0223IF          0224IF          0225IF          0227IF          0234IF

0239LET         0240LET         0241LET         0242LET         0243LET

0244LET         0245LET         0246LET         0247LET         0248LET

0249LET         0250LET         0251LET         0252LET         0253LET

0254LET         0255LET         0256LET         0257LET         0258LET

0259LET         0260LET         0261LET         0262LET         0263IF

0264IF          0265IF          0266IF          0267IF          0268IF

0269IF          0270IF          0271IF          0273IF
```

```
RUNG 0208

!I0489                                                                    *------------------*
+--] [-+------+------+------+------+------+ LET  S0059 - 0322+
!  -02                                                                    *------------------*

CROSS REFERENCE

S0059
0203IF         0208IF         0210CTR        0211IF         0212IF(02)

0213IF(02)     0214IF(02)     0215IF(02)     0216IF(02)     0217IF

0218IF         0219IF         0220IF         0221IF         0222IF

0223IF         0224IF         0225IF         0227IF         0234IF

0239LET        0240LET        0241LET        0242LET        0243LET

0244LET        0245LET        0246LET        0247LET        0248LET

0249LET        0250LET        0251LET        0252LET        0253LET

0254LET        0255LET        0256LET        0257LET        0258LET

0259LET        0260LET        0261LET        0262LET        0263IF

0264IF         0265IF         0266IF         0267IF         0268IF

0269IF         0270IF         0271IF         0273IF

RUNG 0209

!I0489                                                                    *------------------*
+--] [-+------+------+------+------+------+ LET  S0059 - 0333+
!  -03                                                                    *------------------*

CROSS REFERENCE

S0059
0203IF         0208IF         0210CTR        0211IF         0212IF(02)

0213IF(02)     0214IF(02)     0215IF(02)     0216IF(02)     0217IF

0218IF         0219IF         0220IF         0221IF         0222IF

0223IF         0224IF         0225IF         0227IF         0234IF

0239LET        0240LET        0241LET        0242LET        0243LET

0244LET        0245LET        0246LET        0247LET        0248LET

0249LET        0250LET        0251LET        0252LET        0253LET

0254LET        0255LET        0256LET        0257LET        0258LET

0259LET        0260LET        0261LET        0262LET        0263IF

0264IF         0265IF         0266IF         0267IF         0268IF

0269IF         0270IF         0271IF         0273IF
```

```
RUNG 0260

!I0497                                                    *--------------------*
+--] [-+-------+-------+-------+-------+-------+-------+ LET  S0059 - 0347+
!  -01                                                    *--------------------*

CROSS REFERENCE

S0059
0203IF           0208IF          0210CTR         0211IF          0212IF(02)

0213IF(02)       0214IF(02)      0215IF(02)      0216IF(02)      0217IF

0218IF           0219IF          0220IF          0221IF          0222IF

0223IF           0224IF          0225IF          0227IF          0234IF

0239LET          0240LET         0241LET         0242LET         0243LET

0244LET          0245LET         0246LET         0247LET         0248LET

0249LET          0250LET         0251LET         0252LET         0253LET

0254LET          0255LET         0256LET         0257LET         0258LET

0259LET          0260LET         0261LET         0262LET         0263IF

0264IF           0265IF          0266IF          0267IF          0268IF

0269IF           0270IF          0271IF          0273IF

RUNG 0261

!I0497                                                    *--------------------*
+--] [-+-------+-------+-------+-------+-------+-------+ LET  S0059 - 0367+
!  -03                                                    *--------------------*

CROSS REFERENCE

S0059
0203IF           0208IF          0210CTR         0211IF          0212IF(02)

0213IF(02)       0214IF(02)      0215IF(02)      0216IF(02)      0217IF

0218IF           0219IF          0220IF          0221IF          0222IF

0223IF           0224IF          0225IF          0227IF          0234IF

0239LET          0240LET         0241LET         0242LET         0243LET

0244LET          0245LET         0246LET         0247LET         0248LET

0249LET          0250LET         0251LET         0252LET         0253LET

0254LET          0255LET         0256LET         0257LET         0258LET

0259LET          0260LET         0261LET         0262LET         0263IF

0264IF           0265IF          0266IF          0267IF          0268IF

0269IF           0270IF          0271IF          0273IF
```

```
RUNG 0262

!I0301
+--] [-+------+------+------+------+------+------+------+------+  *----------------*
!  -02                                                             + LET   S0039 - 0360+
                                                                   *----------------*

CROSS REFERENCE

S0039
0203IF         0208IF         0210CTR        0211IF         0212IF(02)

0213IF(02)     0214IF(02)     0215IF(02)     0216IF(02)     0217IF

0218IF         0219IF         0220IF         0221IF         0222IF

0223IF         0224IF         0225IF         0227IF         0234IF

0239LET        0240LET        0241LET        0242LET        0243LET

0244LET        0245LET        0246LET        0247LET        0248LET

0249LET        0250LET        0251LET        0252LET        0253LET

0254LET        0255LET        0256LET        0257LET        0258LET

0259LET        0260LET        0261LET        0262LET        0263IF

0264IF         0265IF         0266IF         0267IF         0268IF

0269IF         0270IF         0271IF         0273IF
```

```
RUNG 0263

!*----------------*  00474  00478  00482  00486  00490  00496  00700  00470
+ IF   S0039 > 0139++--]/[-+---]/[-+---]/[-+---]/[-+---]/[-+---]/[-+---]/[-+---( )-
!*----------------*   -16    -16    -16    -16    -16    -16    -02    -16

CROSS REFERENCE

I/00470-16
0263-( )-      0264-]/[-      0273-]/[-
```

```
RUNG 0264

!*----------------*  00478  00482  00486  00700  00474  00470  00470  00466
+ IF   S0039 > 0100++--]/[-+---]/[-+---]/[-+---]/[-+---]/[-+---]/[-+---]/[-+---( )-
!*----------------*   -16    -16    -16    -02    -16  !  -16    -15    -16
!R0074                                                 !
+--] [-+------+------+------+------+------+------+-----+         +         +
!  -01

CROSS REFERENCE

I/00466-16
0264-( )-
```

```
RUNG 0265

!*-------------------* 00478  00482  00486  00490  00700  00502         00474
+ IF    S0039 > 0182++--]/[-+--]/[-+--]/[-+--]/[-+--]/[-+--]/[-+--------+---( )-
!*-------------------*  -16    -16    -16    -16    -16    -02 !  -16           -16
!R0074                                                          !
+--] [-+-------+-------+-------+-------+-------+                +         +
!  -01

CROSS REFERENCE

I/00474-16
0263-]/[-      0264-]/[-      0265-( )-      0273-]/[-

RUNG 0266

!*-------------------* 00482  00486  00490  00498  00502  00700         00478
+ IF    S0039 > 0227++--]/[-+--]/[-+--]/[-+--]/[-+--]/[-+--]/[-+--------+---( )-
!*-------------------*  -16    -16    -16    -16    -16    -02 !                -16
!R0074                                                          !
+--] [-+-------+-------+-------+-------+-------+                +         +
!  -01

CROSS REFERENCE

I/00478-16
0263-]/[-      0264-]/[-      0265-]/[-      0266-( )-      0273-]/[-

RUNG 0267

!*-------------------* 00490  00486  00498  00502  00700                00482
+ IF    S0039 > 0273++--]/[-+--]/[-+--]/[-+--]/[-+--]/[-+----------------+---( )-
!*-------------------*  -16    -16    -16    -16    -02 !                       -16
!R0074                                                  !
+--] [-+-------+-------+-------+-------+                +         +         +
!  -01

CROSS REFERENCE

I/00482-16
0263-]/[-      0264-]/[-      0265-]/[-      0266-]/[-      0267-( )-

0273-]/[-
```

```
RUNG 0268

!*------------------* 00490 00498 00502 00700                              00486
+ IF    S0039 > 0300++--]/[-+--]/[-+--]/[-+--]/[-+------+------+------+---( )-
!*------------------*!  -16    -16 !  -16   -02                             -16
!R0074              !               !
+--] [-+------+------+               +      +      +      +      +
!  -01

CROSS REFERENCE

I/00486-16
0263-]/[-      .0264-]/[-      0265-]/[-      0266-]/[-      0267-]/[-

0268-( )-      0270-]/[-

RUNG 0269

!*------------------* 00498 00502                                          00490
+ IF    S0039 > 0334++--]/[-+--]/[-+------+------+------+------+------+---( )-
!*------------------*!  -16    -16                                          -16
!R0074              !
+--] [-+------+------+      +      +      +      +      +      +      +
!  -01

CROSS REFERENCE

I/00490-16
0263-]/[-      0265-]/[-      0266-]/[-      0267-]/[-      0268-]/[-

0269-( )-      0270-]/[-      0276-] [-

RUNG 0270

!*------------------* I0003                                                00502
+ IF    S0039 > 0399++--]/[-+------+------+------+------+------+------+---( )-
!*------------------*!  -16 !                                               -16
!R0074              !      !
+--] [-+------+------+      +      +      +      +      +      +
!  -01                !
!I0003               !
+--] [-+------+------+      +      +      +      +      +      +
!  -16

CROSS REFERENCE

I/00502-16
0265-]/[-      0266-]/[-      0267-]/[-      0268-]/[-      0269-]/[-

0270-( )-      0271-]/[-      0276-] [-
```

```
RUNG 0271

!*-------------------* 00002  I0003                                              00498
+ IF   S0039 > 0366++--]/[-+--]/[-+-------+-------+-------+-------+-------+---( )-
!*-------------------*  -16 !  -16                                                -16
!R0074           !
+--] [-+-------+-------+------+     +       +       +       +       +       +
!  -01

CROSS REFERENCE

I/O0498-16
0265-]/[-       0266-]/[-       0267-]/[-       0268-]/[-       0269-]/[-

0271-( )-       0275-]/[-       0276-] [-

RUNG 0272

!O0462                                                                           00462
+--] [-+-------+-------+-------+-------+-------+-------+-------+-------+-------+---( )-
!  -11                                                                            -16

CROSS REFERENCE

I/O0462-16
0272-( )-

RUNG 0273

!                                                                              *-TMR--*
+-------+-------+-------+-------+-------+-------+-------+-------+-------+------+!TIME  !
!                                                                              !       !
!                                                                              !       !
+       +       +       +       +       +       +       +       +       +    +!S0070 !
!                                                                              !       !
!I0003 R0074                                                                   !       !
+--] [-+--]/[-+-------+-------+-------+-------+-------+-------+-------+-------+!CLEAR !
!  -15   -02                                                                   !       !
!                                                                              !       !
+       +       +       +       +       +       +       +       +       +    +! .1S  !
!                                                                              !       !
!                                                                              !       !
+       +       +       +       +       +       +       +       +       +    +!       !
!                                                                              !       !
!                                                                              !       !
+       +       +       +       +       +       +       +       +       +    +!- 0900!
!                                                                              !R0074 !
+       +       +       +       +       +       +       +       +       +    +!--( )-!
!                                                                              *---01-*

CROSS REFERENCE

I/O0074-01
0264-] [-       0265-] [-       0266-] [-       0267-] [-       0268-] [-

0269-] [-       0270-] [-       0271-] [-       0273TIMER       0274-] [-

0275-] [-

S0070
0273TIMER
```

```
RUNG 0274
                                                                         *-TMR--*
                                                                         !TIME  !
                                                                         !      !
                                                                         !S0071 !
!R0074                                                                   !      !
+--] [-+-----------+-----------+----------+----------+------------+------+!CLEAR !
!  -01                                                                   !      !
                                                                         ! .1S  !
                                                                         !      !
                                                                         !      !
                                                                         ! 4000 !
                                                                         !R0074 !
                                                                         !--( )-!
                                                                         *--02--*

CROSS REFERENCE

I/00074-02
0273-]/[-      0274TIMER

S0071
0274TIMER

RUNG 0275

!*------------------* 00478  00482  00486  00498  00474  00470  00430  00470
+ IF    S0039 > 0120+--]/[-+--]/[-+--]/[-+--]/[-+--]/[-+--]/[-+--]/[-+--( )-
!*------------------*  -1S    -1S    -1S    -1S    -1S    -1S    -1S    -1S
!R0074
+--] [-+-----------+-----------+----------+----------+------------+
!  -01

CROSS REFERENCE

I/00470-1S
0264-]/[-      0275-( )-
```

```
RUNG 0276

!D0496                                                                    D0700
+--] [-+-------+-------+-------+-------+-------+-------+-------+-------+--( )-
!  -16 !                                                                   -02
!D0502 !
+--] [-+    +       +       +       +       +       +       +       +       +
!  -16 !
!D0490 !
+--] [-+    +       +       +       +       +       +       +       +
!  -16

CROSS REFERENCE

I/D0700-02
0263-]/[-      0264-]/[-      0265-]/[-      0266-]/[-      0267-]/[-

0268-]/[-      0276-( )-

RUNG 0277

!I0003                                                                    N0004
+--] [-+-------+-------+-------+-------+-------+-------+-------+-------+--(L)-
!  -10                                                                     -01

CROSS REFERENCE

I/D0004-01
0277-(L)-      0278-(U)-      0279-] [-

RUNG 0278

!I0003                                                                    N0004
+--] [-+-------+-------+-------+-------+-------+-------+-------+-------+--(U)-
!  -11                                                                     -01

CROSS REFERENCE

I/D0004-01
0277-(L)-      0278-(U)-      0279-] [-
```

```
RUNG 0279
                                                                              *--THR--*
!----------------------------------------------------------------------------+!TIME  !
+--+------+------+------+------+------+------+------+------+------+------+---+!      !
!                                                                             !      !
+   +      +      +      +      +      +      +      +      +      +        +!S0005 !
!N0004                                                                        !      !
+--] [-+------+------+------+------+------+------+------+------+------+------+!CLEAR !
!  -01                                                                        !      !
+   +      +      +      +      +      +      +      +      +      +        +! .1S  !
!                                                                             !      !
+   +      +      +      +      +      +      +      +      +      +        +!      !
!                                                                             !      !
+   +      +      +      +      +      +      +      +      +      +        +!- 0300!
!                                                                             !N0004 !
+   +      +      +      +      +      +      +      +      +      +        +!--( )=!
!                                                                             *---06-*

CROSS REFERENCE

I/00004-06
0279TIMER

S0005
0279TIMER

RUNG 0280

!I0483                                                                       R0901
+--] [-+------+------+------+------+------+------+------+------+------+------+--(L)-
!  -05                                                                        -01

CROSS REFERENCE

I/00901-01
0280-(L)-        0281-(U)-        0282-] [-

RUNG 0281

!I0003                                                                       R0901
+--] [-+------+------+------+------+------+------+------+------+------+------+--(U)-
!  -14                                                                        -01

CROSS REFERENCE

I/00901-01

0280-(L)-        0281-(U)-        0282-] [-
```

```
RUNG 0282
                                                                          *-TMR--*
 !                                                                        +!TIME !
+--------+-------+-------+-------+-------+-------+-------+-------+--------+!      !
 !                                                                        !      !
 +       +       +       +       +       +       +       +       +       +!S0902 !
 !                                                                        !      !
!R0901                                                                    !      !
+---] [--+-------+-------+-------+-------+-------+-------+-------+--------+!CLEAR !
 ! -01                                                                    !      !
 +       +       +       +       +       +       +       +       +       +! .1S  !
 !                                                                        !      !
 +       +       +       +       +       +       +       +       +       +!      !
 !                                                                        !      !
 +       +       +       +       +       +       +       +       +       +!- 0050!
 !                                                                        !R0901 !
 +       +       +       +       +       +       +       +       +       +!--( )-!
 !                                                                        *---02-*

CROSS REFERENCE

I/O0901-02
0282TIMER

S0902
0282TIMER

RUNG 0283

!*-------------------*                                                    00483
+ IF    S0493 - 2908++------+-------+-------+-------+-------+-------+-----+--( )-
!*-------------------*                                                    -09

CROSS REFERENCE

I/O0483-09
0283-( )-
```

We claim:

1. A communication system for use in a mine to provide two-way communication between a conveyance which moves in a mine and a communication network located in the mine, the system comprising:
   (a) means for producing a signal indicative of the position of the conveyance in the mine;
   (b) a plurality of repeater means situated in the mine and being coupled to said communication network;
   (c) controller means for controlling said repeater means and said controller means being responsive to said signal and having means for activating said repeater means which is proximate to the conveyance so that a communication link is provided between the conveyance and the communication network;
   (d) a plurality of proximity switches at selected locations in the mine, said proximity switches including means for producing a reference location signal in response to the conveyance coming within proximity of said proximity switch and said controller means including means responsive to said reference location signal and means for verifying the position of the conveyance.

2. The system claimed in claim 1, wherein said means for producing a signal indicative of the location of the conveyance comprises a digital encoder coupled to the conveyance and a counter coupled to said encoder and said controller means.

3. The system claimed in claim 2, wherein said controller means comprises a programmable computer having means for receiving a count signal from said counter and means for determining the position of the conveyance in the mine from said count signal.

4. The system claimed in claim 3, wherein said means for activating said repeater means comprises a control line coupled to said repeater means and means responsive to said controller means for interrupting said control line.

5. The system claimed in claim 4, wherein said repeater means comprises a cordless telephone station, and the conveyance includes a telephone set for use with said telephone station.

6. A method for controlling the operation of a communication system for use in a mine having a telephone set located in a conveyance which moves in a mine shaft, and a plurality of repeater stations located adjacent the mine shaft and coupled to a telephone system, said method including the steps of:
   (a) determining the position of the conveyance in the mine shaft;
   (b) determining the repeater station which is proximate to the conveyance and activating said proximate repeater station so that a communication link is provided between the telephone set in the conveyance and the communication network;
   (c) deactivating said other repeater stations; and
   (d) verifying the position of the conveyance by using a plurality of proximity switches at selected reference positions in the mine to generate a reference location, and comparing said reference location to the position of the conveyance.

7. A communication system for use in a mine to provide two-way communication between a conveyance which moves in a mine and a communication network located in the mine, the system comprising:
   (a) means for producing a signal indicative of the position of the conveyance in the mine;
   (b) a plurality of repeater means situated in the mine and being coupled to said communication network;
   (c) controller means for controlling said repeater means and said controller means being responsive to said signal and having means for activating said repeater means which is proximate to the conveyance so that a communication link is provided between the conveyance and the communication network; and
   (d) one or more proximity switches at selected locations in the mine, said proximity switches including means for producing a reference location signal in response to the conveyance coming within proximity of said proximity switch and said controller means including means responsive to said reference location signal and means for verifying the position of the conveyance.

* * * * *